Oct. 13, 1942.                J. P. RATHBUN                2,298,511
                  SEALING CLOSURE FOR HIGH-PRESSURE HEADS
                            Filed May 11, 1938
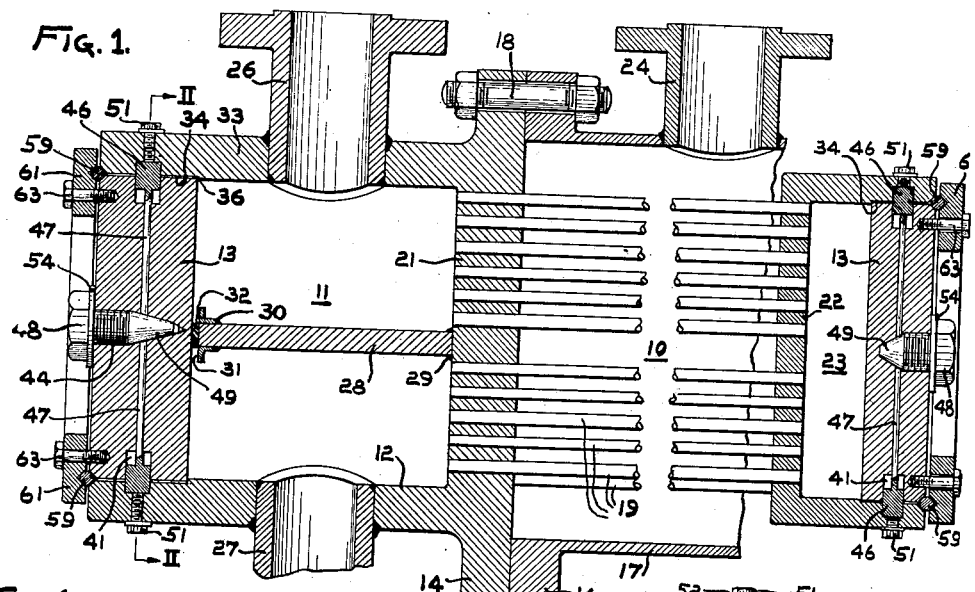
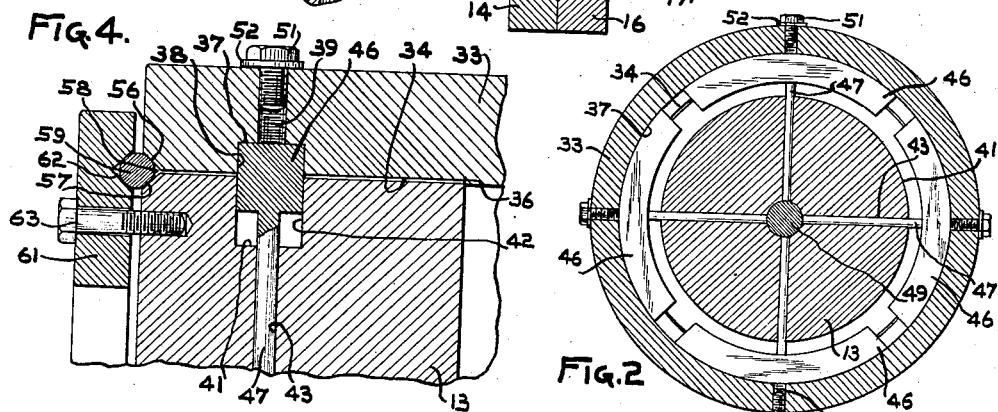
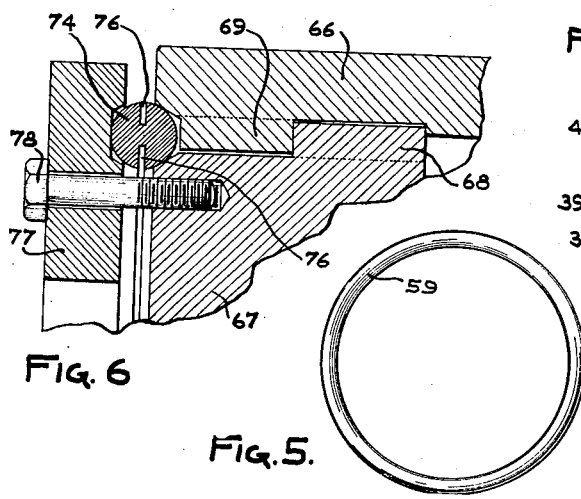
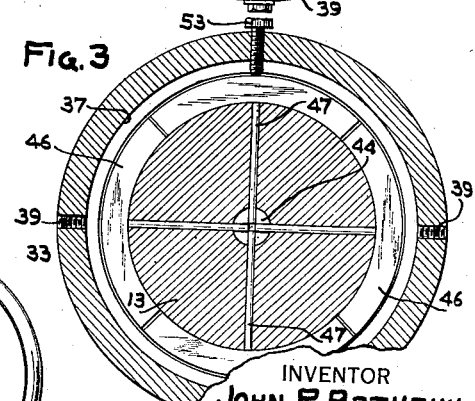
INVENTOR
JOHN P. RATHBUN
BY
ATTORNEY Patented Oct. 13, 1942

2,298,511

UNITED STATES PATENT OFFICE 2,298,511

SEALING CLOSURE FOR HIGH-PRESSURE HEADS

John P. Rathbun, Prospect Park, Pa., assignor to Westinghouse Electric & Manufacturing Company, East Pittsburgh, Pa., a corporation of Pennsylvania Application May 11, 1938, Serial No. 207,201

2 Claims. (Cl. 220—55)

This invention relates to closures for pressure vessels and more particularly to covers or closure members for high-pressure heads of heat exchange apparatus, and has for an object the provision of novel sealing means therefor.

Another object of the invention is the provision of novel sealing means for high-pressure heads, which will function equally well with the application of either internal or external pressures.

A further object of the invention is the provision of novel sealing means which is deformable to provide for unavoidable variations in dimensions of parts.

Another object of the invention is the provision of sealing means wherein the sealing pressure area is reduced to a minimum.

Yet another object of the invention is the provision in high-pressure heads, wherein the internal load on the cover is transmitted to the body portion of the head through shear pieces, of novel means for moving the shear pieces to operative position.

These and other objects are effected by my invention as will be apparent from the following description and claims taken in accordance with the accompanying drawing, forming a part of this application, in which:

Fig. 1 is a longitudinal sectional view through a heat exchanger embodying the invention;

Fig. 2 is a transverse section on the line II—II of Fig. 1 looking in the direction of the arrows, and showing the shear pieces in operative position;

Fig. 3 is a view similar to Fig. 2 but showing the shear pieces moved radially inwardly to inoperative position;

Fig. 4 is an enlarged sectional view showing a portion of the structure of Fig. 1;

Fig. 5 is a plan view of the sealing element used in the construction of Fig. 1; and Fig. 6 is an enlarged sectional view of a modification of the invention.

In the drawing, there is shown an elongated tubular heat exchanger 10 having a high-pressure head 11 at one end thereof, the head including a body portion 12 and a cover 13. The head 11 is provided with a flange 14 by which it is attached to the flange 16 of the shell 17 by suitable means, such as bolts 18.

A plurality of tubes 19 extend longitudinally of the shell 17, with one of their terminal portions mounted in the tube plate wall 21 of the head 11, and with their other terminal portions mounted in the tube plate wall 22 of the floating head 23.

The shell 17 is provided with an inlet 24, and, where the heat exchanger is of the two-pass type, as herein shown, the high-pressure head is provided with an inlet 26 and an outlet 27.

The space within the head 11 is divided by a partition 28, which, preferably, is welded to the tube sheet plate 21, as at 29, and has at its outer end angles 30 providing a flat face 31, of material width. Preferably, a seal is maintained between the face 31 of the partition 28 and the cover 13 by a compressible gasket 32 positioned therebetween.

As the closure and sealing construction of the floating head 23 is identical with that of the stationary head 11, a detailed description of one will suffice. Like parts are indicated by like reference characters.

Preferably, a cylindrical wall 33 of the body portion 12 is counterbored, as at 34, to provide a radial shoulder 36 limiting inward movement of the cover 13 during assembly thereof. An inwardly-facing circumferential groove 37 is formed in the counterbore 34, outwardly of the shoulder 36 and providing a radial thrust shoulder 38. A plurality of threaded bolt holes 39 extend radially through the wall 33 from the bottom of the groove 37, for a purpose to be later explained.

The cover 13 is in the form of a relatively heavy disk having a peripheral groove 41 providing a radial thrust shoulder 42, the grooves 41 and 37 being radially aligned and complementally providing a closed annular passage. A plurality of radial passages 43 connect the groove 41 with an axially-extending opening 44.

A plurality of arcuate shear pieces 46 are mounted in the annular passageway for limited radial movement therein, the groove 41 having such depth that the shear pieces may be retracted to or within the cylindrical boundary of the cover. The shear pieces have actuating rods 47 slidably fitting the radial passages 43 and the rods are of such length that, when the shear pieces are at the inner limit of their radial movement, the inner ends of the rods are adjacent the center of the axial opening 44 in the cover. A bolt 48 having a tapered point 49 is threadedly mounted in the axial opening 44, the tapered point 49 having a cam or wedging action on the ends of the rods, whereby inward movement of the bolt 48 causes outward radial movement of the shear pieces 46 to operative position.

During normal use of the heat exchanger, the threaded openings 39 in the cylindrical wall 33 of the body member are closed by short bolts 51 having sealing gaskets 52 under their heads.

When it is desired to remove the cover 13 from the head, the tapered bolt 48 is removed from the cover, the short bolts 51 are removed from the holes 39, and relatively long bolts 53 substituted for the latter, these bolts being of sufficient length to contact the shear pieces and force them radially inwardly to inoperative position, Fig. 3.

During normal operation of the heat exchanger leakage around the bolt 48 is prevented by use of a gasket 54 beneath the head thereof, similar to the gaskets 52 associated with the bolts 51.

The cover 13 fits closely within the counterbore 34 of the body member, thereby providing a relatively small clearance between these two members. This clearance is sealed by the novel means now to be described.

Adjacent corners of the wall 33 and the cover 13 are chamfered, as at 56 and 57, respectively, thereby providing an annular V-shaped groove 58 for the sealing ring 59, preferably of circular cross section and made of copper or any material having the desired physical properties for sealing and including that of suitability for the fluids handled. The sealing ring is pressed into the groove 58 by means of an annular pressure plate 61 having an annular groove 62 for the ring, the necessary sealing pressure being secured by a plurality of clamping bolts 63 threadedly mounted in the cover 13. Tightening of these bolts will apply pressure to the metallic sealing ring to deform the latter and force it into sealing engagement with the chamfered surfaces 56 and 57.

This sealing means is of particular advantage with closures of the type herein shown, in that it will deform to provide for unavoidable variations in dimensions of parts. It has a further advantage in floating head constructions, such as shown at the right of Fig. 1, since the pressure plate is bolted to the cover and, therefore, will take the reverse load resulting from shell pressure on the floating head when no pressure is applied inside the body member.

In Fig. 6, there is shown a modification of the invention wherein a modified sealing ring 74 is shown applied to an alternate closure construction, the latter being of the breach-block type and comprising a plurality of bayonet projections 68 abutting similar projections 69 on the body member 66. The modified sealing ring herein shown differs from the ring described above in that radially extending grooves 76 are formed in the inner and outer surfaces thereof to increase the deformability of the ring. Sealing pressure is applied, as before, by an annular pressure plate 77 and clamping bolts 78 in the cover 67.

While I have shown my invention in several forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. Apparatus of the character described comprising a hollow pressure-sustaining body member having an opening at one end and an inwardly facing circumferential recess in the wall of the opening providing a thrust shoulder; a cover in the opening overlapping said recess and having an outwardly facing circumferential recess providing a thrust shoulder, said recesses being aligned and complementally forming a closed annular passage, the cover having a plurality of radial passages connecting at their outer ends with the circumferential recess in said cover; a plurality of shear pieces in the passage and movable radially therein; operating means in the radial passages operatively associated with said shear pieces; a bolt threadedly mounted in the cover and extending axially thereof, said bolt having a conical tapered portion operatively engaging the inner ends of the operating means to cause the latter to move the shear pieces radially in the passage, said shear pieces at the inner limit of their movement being disposed entirely within the circumferential recess of the cover, whereby said cover and shear pieces may be removed from the opening in the body member, and at the outer limit of their movement being partially in both recesses whereby they may transmit pressure from the cover to the body member; and sealing means between said cover and said body member.

2. Apparatus of the character described comprising a hollow, pressure-sustaining body member having a main opening at one end and an inwardly facing circumferential recess in the wall of the opening providing a thrust shoulder; a cover in the opening overlapping said recess and having an outwardly facing circumferential recess providing a thrust shoulder, said recesses being aligned and complementally forming a closed annular passage, the cover having a plurality of radial passages connecting at their outer ends with the circumferential recess in said cover; a plurality of shear pieces in the passage and movable radially therein; rods in said radial passages having their outer ends operatively associated with the shear pieces; a bolt threadedly mounted in the cover and extending axially thereof, said bolt having a tapered conical portion contacting the inner ends of the rods whereby adjustment of said bolt in one direction will cause the tapered portion thereof to wedge the rods radially outward and move the shear pieces radially to operative position partially in both recesses to transmit pressure from the cover to the body member; said body member having a plurality of openings extending radially through the wall thereof into its circumferential recess, and through which means may be inserted for moving the shear pieces radially inward so that they are disposed entirely within the recess in the cover, whereby said cover and shear pieces may be removed from the main opening in the body member; bolts threadedly received in the radial openings of the body member for normally closing the same; sealing means under the heads of said bolts; sealing means under the head of the tapered bolt; and sealing means between the cover and the body member.

JOHN P. RATHBUN.